UNITED STATES PATENT OFFICE.

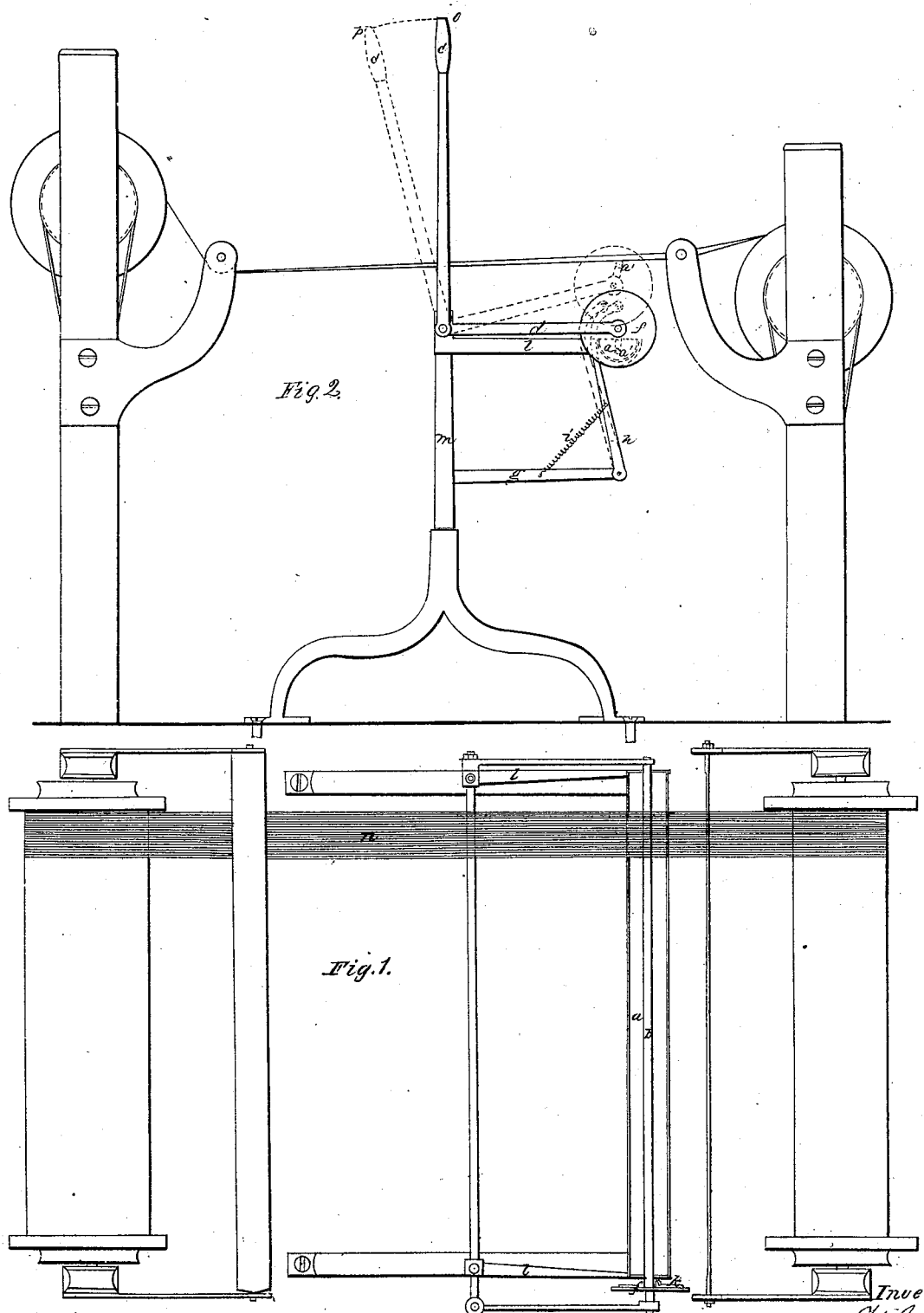

WILLIAM G. PERRY, OF MANCHESTER, NEW HAMPSHIRE.

IMPROVED MACHINE FOR PRODUCING WEAVERS' CUT-MARKS.

Specification forming part of Letters Patent No. 84,301, dated November 24, 1868.

*To all whom it may concern:*

Be it known that I, WILLIAM G. PERRY, of the city of Manchester, in the county of Hillsborough, in the State of New Hampshire, have invented a new and useful Machine for Preventing the Embezzlement of Cloth Goods, in their manufacture, by the workmen, which I call a "cloth-marker;" and I do hereby declare that the following is a full, clear, and exact description of the construction and operation of the same, reference being had to the annexed drawings, making part of this specification, in which—

Figure 1 is a plan, and Fig. 2 an end elevation.

$a$ is a trough to contain coloring-matter. $b$ is a shaft, carrying beneath it a wire (seen at $a'$ in Fig. 2) capable of taking up and transferring the color from the trough $a$ to the yarn at any time, according to the will of the operator. $c$ is a handle for operating the arm $d$, to which is attached the cylinder $b$. $f$ is a disk made fast to the cylinder $b$. $g$ is a fixed arm, to which is attached the sweep $h$, the upper end of which is likewise attached to the disk $f$ near its periphery. $i$ is a spiral spring, drawing the sweep from its dead-center. $k$ is an adjustable stop working against the sweep $h$. $l$ is a fixed arm for holding the trough $a$. $m$ is a standard, sustaining the arms $g$ and $l$. $n$ is the web in the dressing-frame.

To operate this machine, the handle $c$ is carried through the arc $o$ $p$, which will bring the wire $a'$, attached to the cylinder $b$, from its position in the coloring-trough $a$, and, by means of the disk $f$ and the sweep $h$, cause it to revolve so as to bring it, with the color adhering to it, in contact with one or more tiers of threads in the web, according as the handle is carried through a smaller or larger portion of the arc.

What I claim as my invention, and desire to secure by Letters Patent, is—

The shaft $b$, with the wire $a'$, or its substitute, attached, and the trough $a$, and the disk and sweep by which the wire is brought from its state of immersion in the color-trough into contact with the web of yarn, all substantially as and for the purpose set forth.

WILLIAM G. PERRY.

Witnesses:
 A. M. CHAPIN,
 M. P. HALL.